United States Patent
Alspach et al.

(10) Patent No.: US 12,065,134 B2
(45) Date of Patent: Aug. 20, 2024

(54) WHEEL WELL MOUNTED DEPTH SENSORS FOR TIRE MONITORING

(71) Applicant: Toyota Research Institute, Inc., Los Altos, CA (US)

(72) Inventors: Alexander Alspach, Somerville, MA (US); Calder Phillips-Grafflin, Jamaica Plain, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 529 days.

(21) Appl. No.: 17/221,015

(22) Filed: Apr. 2, 2021

(65) Prior Publication Data

US 2022/0314970 A1 Oct. 6, 2022

(51) Int. Cl.
*B60W 30/09* (2012.01)
*B60C 11/24* (2006.01)
*B60C 19/00* (2006.01)
*B60K 28/10* (2006.01)
*G01B 11/24* (2006.01)

(52) U.S. Cl.
CPC ........... *B60W 30/09* (2013.01); *B60C 11/246* (2013.01); *B60C 19/00* (2013.01); *B60K 28/10* (2013.01); *G01B 11/24* (2013.01); *B60C 2019/004* (2013.01); *B60W 2530/20* (2013.01); *B60W 2555/20* (2020.02)

(58) Field of Classification Search
CPC ............. B60W 30/09; B60W 2530/20; B60W 2555/20; B60W 2050/0095; B60W 2552/35; B60W 2552/40; B60W 30/182; B60C 11/246; B60C 19/00; B60C 2019/004; B60C 11/243; B60K 28/10; G01B 11/24; G01B 11/22
See application file for complete search history.

(56) References Cited

U.S. PATENT DOCUMENTS

| 11,396,152 | B1* | 7/2022 | Roy ........................ B29C 64/20 |
| 2005/0159855 | A1* | 7/2005 | Sugiura ................. B60C 23/068 |
| | | | 702/155 |
| 2019/0193480 | A1 | 6/2019 | Pulford et al. |
| 2019/0337391 | A1* | 11/2019 | Crombez ............. B60W 30/02 |
| 2020/0031173 | A1 | 1/2020 | Sheckter |

FOREIGN PATENT DOCUMENTS

| DE | 102018006477 A1 | 2/2019 |
| EP | 4177588 A1 * | 5/2023 |
| JP | 4606555 B2 * | 1/2011 |

(Continued)

*Primary Examiner* — Peter D Nolan
*Assistant Examiner* — Demetra R Smith-Stewart
(74) *Attorney, Agent, or Firm* — DINSMORE & SHOHL LLP

(57) ABSTRACT

A method and system for adjusting vehicle operations. Wheel sensors are disposed to detect parameters associated with treads of wheels and parameters associated with road conditions. An electronic control unit receives information from the wheel sensors. The electronic control unit determines a performance metric of the wheels based on the parameters associated with treads. The electronic control unit receives determine adjustments for operation of the vehicle based on the performance metric and the parameters associated with road conditions.

18 Claims, 4 Drawing Sheets

(56) References Cited

FOREIGN PATENT DOCUMENTS

| | | | |
|---|---|---|---|
| KR | 101310160 B1 | 9/2013 | |
| KR | 20130134394 A | 12/2013 | |
| KR | 102002450 B1 | 7/2019 | |
| KR | 20200139356 A | 12/2020 | |
| WO | WO-2018137920 A1 * | 8/2018 | ........... B60C 11/243 |

* cited by examiner

WHEEL WELL MOUNTED DEPTH SENSORS FOR TIRE MONITORING

TECHNICAL FIELD

The present specification relates to systems and methods for providing control of a vehicle based on detected parameters of wheels and road conditions, and more specifically, to systems and methods for utilizing wheel well mounted sensors that detect wheel conditions and road conditions for adjusting operation of the vehicle.

BACKGROUND

In some traditional systems, pressure sensors are disposed within wheels of vehicles to monitor tire pressure. The information that can be gathered from pressure sensors is limited. Further, some vehicles include different selectable driving modes. Traditionally, a user selects a driving mode when operating the vehicle. The driving modes typically do not make adjustments to the vehicle based on the wheels.

Accordingly, a need exists for utilizing wheel sensors to adjust operation of a vehicle. Further, it may be desirable to more efficiently control vehicle operation, monitor wheel fitness, provide notifications regarding wheel fitness, or otherwise utilize wheel sensors.

SUMMARY

In one embodiment, a system includes one or more wheel sensors operable to be disposed at least one of within one or more wheels of a vehicle or at one or more wheel wells of the vehicle. The one or more wheel sensors are configured to detect one or more parameters associated with treads of the one or more wheels and one or more parameters associated with road conditions. The system can include an electronic control unit. The electronic control unit is configured to receive, from the one or more wheel sensors, the one or more parameters associated with treads of the one or more wheels and the one or more parameters associated road conditions, determine a performance metric of the one or more wheels based on the one or more parameters associated with treads of the one or more wheels; and determine one or more adjustments for operation of the vehicle based at least in part on the performance metric of the one or more wheels and the one or more parameters associated with the road conditions.

In another embodiment, a system includes a plurality of wheel sensors each disposed at one of a plurality of wheel wells of a vehicle, and each configured to include a line of sight that operatively includes one of a plurality of wheels of the vehicle, a driving surface proximal the plurality of wheels of the vehicle, or both. The plurality of wheel sensors may each be configured to detect one or more parameters associated with treads of respective ones of the plurality of wheels, one or more parameters associated with road conditions, or both. In embodiments, the system may include electronic control unit, wherein the electronic control unit is configured to receive, from the plurality of wheel sensors, the one or more parameters associated with treads of the plurality of wheels and the one or more parameters associated road conditions, determine a performance metric for each of the plurality of wheels based on the one or more parameters associated with treads of the plurality of wheels; and determine one or more adjustments for operation of the vehicle based at least in part on the performance metric for each of the plurality of wheels and the one or more parameters associated with the road conditions.

In yet another embodiment a method includes detecting, by a plurality of sensors disposed at a plurality of wheel wells of a vehicle, one or more environmental factors associated with road conditions, and tread data associated with treads of a plurality of wheels of the vehicle. The method may further include determining differences between the treads of the plurality of wheels based on the tread data and adjusting operation of vehicle based at least in part on the one or more environmental factors and the differences associated with the treads.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments of the present disclosure describe systems and methods that provide one or more sensors on or within one or more tires of a vehicle. The one or more sensors are configured to monitor attributes of a tire. In embodiments, the one or more sensors may be mounted onto the wheel wells of a vehicle. In embodiments, the one or more sensors may be a depth sensor or a camera, e.g., RGB, RGB-D or black and white camera. The one or more sensors may have a one-dimensional array of pixels (i.e., a line sensor) that scans a line over the tread of the tire as the tire rotates.

Figure 1:
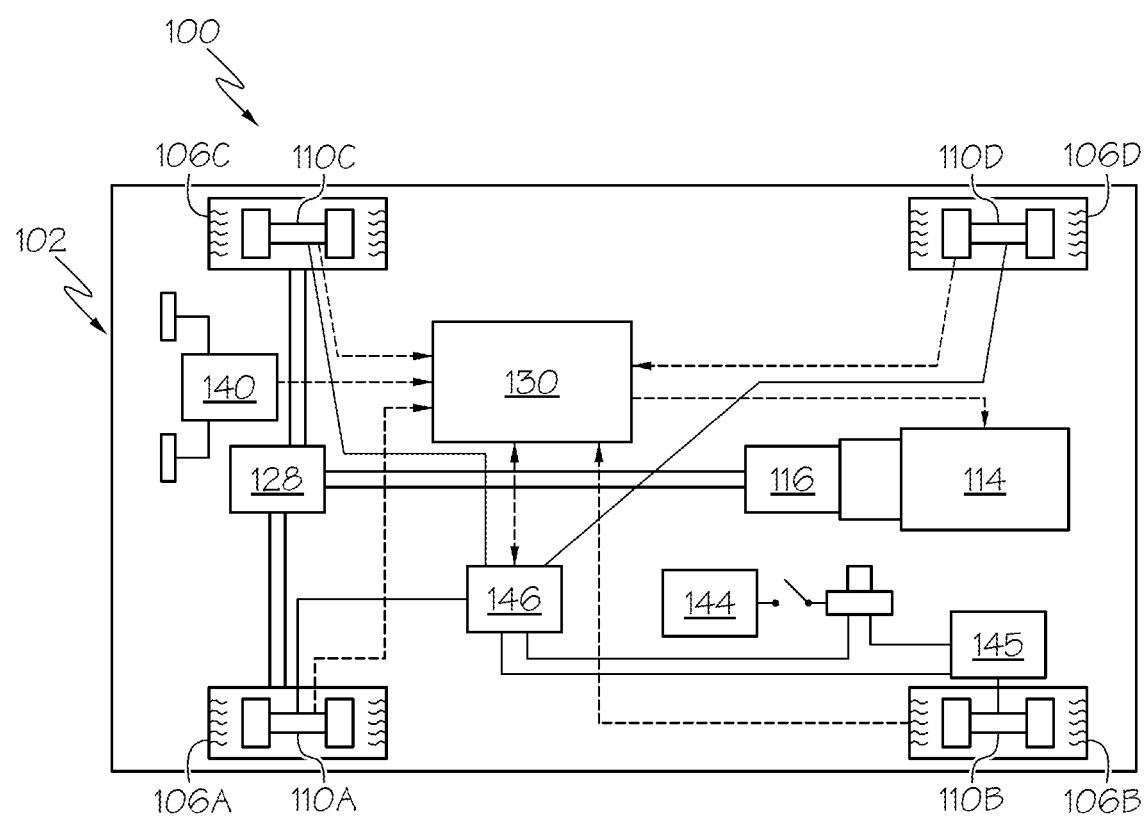
FIG. 1 schematically depicts an example vehicle system including a vehicle that includes wheel sensors, according to one or more embodiments described and illustrated herein.

FIG. 1 schematically depicts an example vehicle control system 100 for an example vehicle 102, such as an automobile (e.g., car, truck, etc.), motorcycle, or other vehicles. The vehicle control system 100 may provide the vehicle 102 with driving assistance control according to some embodiments of the disclosure. As illustrated in FIG. 1, the vehicle 102 includes a plurality of wheels, such as right front wheel 106A, a left front wheel 106C, a right rear wheel 106B, and a left rear wheel 106D. Vehicles may include other, different, or less wheels. For example, a truck may include two or more left rear wheels and/or right rear wheels, additional sets of wheels, or the like. The right front wheel 106A, left front wheel 106C, right rear wheel 106B, and left rear wheel 106D can comprise any appropriate make and model for a particular make and model of the vehicle 102.

The example vehicle 102 includes an electronic control unit 150, electric motor and/or engine 114, a braking-system apparatus 146, a steering apparatus (not shown), and one or more wheel sensors (e.g., wheel sensors 110A, 110B, 110C, and/or 110D). The engine 114 generates a driving force for each wheel in response to depression of an accelerator pedal by a driver, commands from the electronic control unit 150, or commands from one or more other components of the vehicle 102. The steering apparatus is configured to control a steering angle of one or more of the right front wheel 106A, left front wheel 106C, right rear wheel 106B, and left rear wheel 106D. The steering apparatus may be an ordinary steering apparatus that transmits the rotation of a steering wheel operated by the driver and/or autonomously by the electronic control unit 150 to tie rods, thereby steering the right front wheel 106A, the left front wheel 106C, or other wheels. The steering apparatus may be a power steering apparatus.

In embodiments, the drive train is configured such that drive torque or a turning force is transmitted from the engine 114 to the one or more of the right front wheel 106A, left front wheel 106C, right rear wheel 106B, and left rear wheel 106D. For instance, the vehicle 102 may comprise a drive train configured for front wheel drive, rear wheel drive, all-wheel drive, adaptive drive, etc. Based on the drive train configured, the engine 114 appropriately drives one or more of the right front wheel 106A, left front wheel 106C, right rear wheel 106B, and left rear wheel 106D. For example, the engine 114 transmits driving force via a transmission 116 and a differential gear device 128. It is noted that the engine 114 may include an engine and one or more motors, such as differential motors, magnet synchronous motors, or other motors as in a hybrid vehicle. Accordingly, an electric motor may comprise direct torque, additional torque, or otherwise provide torque to one or more of the right front wheel 106A, left front wheel 106C, right rear wheel 106B, and left rear wheel 106D with or without the transmission 116.

The electronic control unit 130 includes a unit for controlling the running state of the engine 114, other control units, subsystems, or systems of the vehicle 102. The electronic control unit 130 may include one or more units communicatively coupled together. In an example, the electronic control unit 130 generally includes a microprocessor 132 (FIG. 2) and a computer readable memory 134 (FIG. 2) that stores processing programs and data. The electronic control unit 130 is connected with various sensors, such as wheel sensors 106A, 106B, 106C, and 106D. In embodiments, the electronic control unit 130 may execute anti-lock brake control, a traction control, an electronic stability control, a dynamic yaw rate control, driving modes, and other control processes.

According to at least some embodiments, the electronic control unit 130 may selectively control the engine 114. In an example, the electronic control unit 130 transmits control signals to the engine 114 based on a driving mode, which may be selected by a user, selected by the electronic control unit 130, such as based on user input, environmental conditions and/or wheel conditions as described herein. In examples, a driving mode can include manual modes, autonomous modes, or semi-autonomous modes (e.g., adaptive cruise control lane assist modes). Moreover, a driving mode may include modes based on environmental conditions, vehicle 102 information, or the like, such as a sand driving mode, wet driving mode, snow/ice driving modes, a dry driving mode, performance driving modes, power saving driving modes, etc.

A drive mode, for instance, may include instructions regarding braking control, steering control, torque output, selection, timing, or other parameters for control of a drive train, such as selection and/or timing of one or more differentials coupled to the engine 114. The electronic control unit 130 may vary control of the one or more differentials, the electronic control unit 130 may adjust output torque from the engine 114 to the right front wheel 106A, left front wheel 106C, right rear wheel 106B, and left rear wheel 106D. For instance, torque distributed to any one of the right front wheel 106A, left front wheel 106C, right rear wheel 106B, and left rear wheel 106D may be increased or decreased according to the drive mode. In embodiments, the electronic control unit 130 may adjust torque or power provided to one or more the right front wheel 106A, left front wheel 106C, right rear wheel 106B, and left rear wheel 106D based on environmental conditions, information from sensors, or the like.

The braking-system apparatus 146 generates a braking force for one or more of the right front wheel 106A, left front wheel 106C, right rear wheel 106B, and left rear wheel 106D. The braking-system apparatus 146 can be of any appropriate configuration. In some embodiments, the braking-system apparatus 146 is an electronically-controlled hydraulic braking apparatus configured such that the braking-system apparatus 146 applies a braking pressure in each of wheel cylinders of one or more of the right front wheel 106A, left front wheel 106C, right rear wheel 106B, and left rear wheel 106D. In some embodiments, the braking-system apparatus 146 may include a hydraulic circuit, a brake pedal 144, and a master cylinder 145. The master cylinder 145 may be actuated in response to depression of a brake pedal 144 by the driver and/or in response to a command from the electronic control unit 130, such as in autonomous vehicles or semi-autonomous vehicles. A hydraulic circuit can selectively provide communication between the master cylinder 145 and other components, such as wheel cylinders, an oil pump, or an oil reservoir.

The electronic control unit 130 may calculate a braking force of each wheel, such as front wheel 106A, left front wheel 106C, right rear wheel 106B, and left rear wheel 106D. The electronic control unit 130 may communicate the calculated braking force to the braking-system apparatus 146, which may apply appropriate brake force to the right front wheel 106A, left front wheel 106C, right rear wheel 106B, and left rear wheel 106D. The braking-system apparatus 146 may be configured such that a braking force is applied to each wheel pneumatically, electromagnetically, or as otherwise configured. Further, the braking-system apparatus 146 may be configured as an antilock braking system, an anti-slip braking system, or the like.

In embodiments, the wheel sensors 110A, 110B, 110C, and/or 110D may each include one or more device configured to measure or detect parameters associated with the right front wheel 106A, left front wheel 106C, right rear wheel 106B, and left rear wheel 106D. Still referring to FIG. 1, the wheel sensors 110A, 110B, 110C, and/or 110D may each include one or more devices configured to measure or detect parameters associated with a driving surface or roadway. The wheel sensors 110A, 110B, 110C, and/or 110D may include one or more of imaging devices (e.g., cameras, depth cameras, RGB, RGB-D or black and white camera, etc.), a scanner comprising a one dimensional array of pixels (e.g., a line sensor) that scans a line, radar devices (e.g., emitters, transmitters, receivers, transceivers, etc.), tread sensors (e.g., including capacitors and conductive ink tread sensors), pressure sensor disposed within a wheel, a temperature sensor disposed within a wheel to measure an internal temperature of a wheel, or other sensor devices. In some embodiments, the wheel sensors 110A, 110B, 110C, and/or 110D may be adjustable to adjust a focus length in the x, y, z, plane of FIG. 3, the field of view 111 (FIG. 3), or other parameters. The wheel sensors 110A, 110B, 110C, and/or 110D may include one or more sensor cleaning apparatuses configured to clean one or more of the plurality of wheel sensors of foreign substances. The sensor cleaning apparatuses may include pressurized fluids dispersed from nozzles to emit fluid on the wheel sensors 110A, 110B, 110C, and/or 110D, mechanical arms configured to wipe the wheel sensors 110A, 110B, 110C, and/or 110D, or other assemblies. The cleaning apparatuses may be activated upon triggering events, such as passage of time, detection of a foreign substance on the wheel sensors 110A, 110B, 110C, and/or 110D, or the like.

Figure 3:
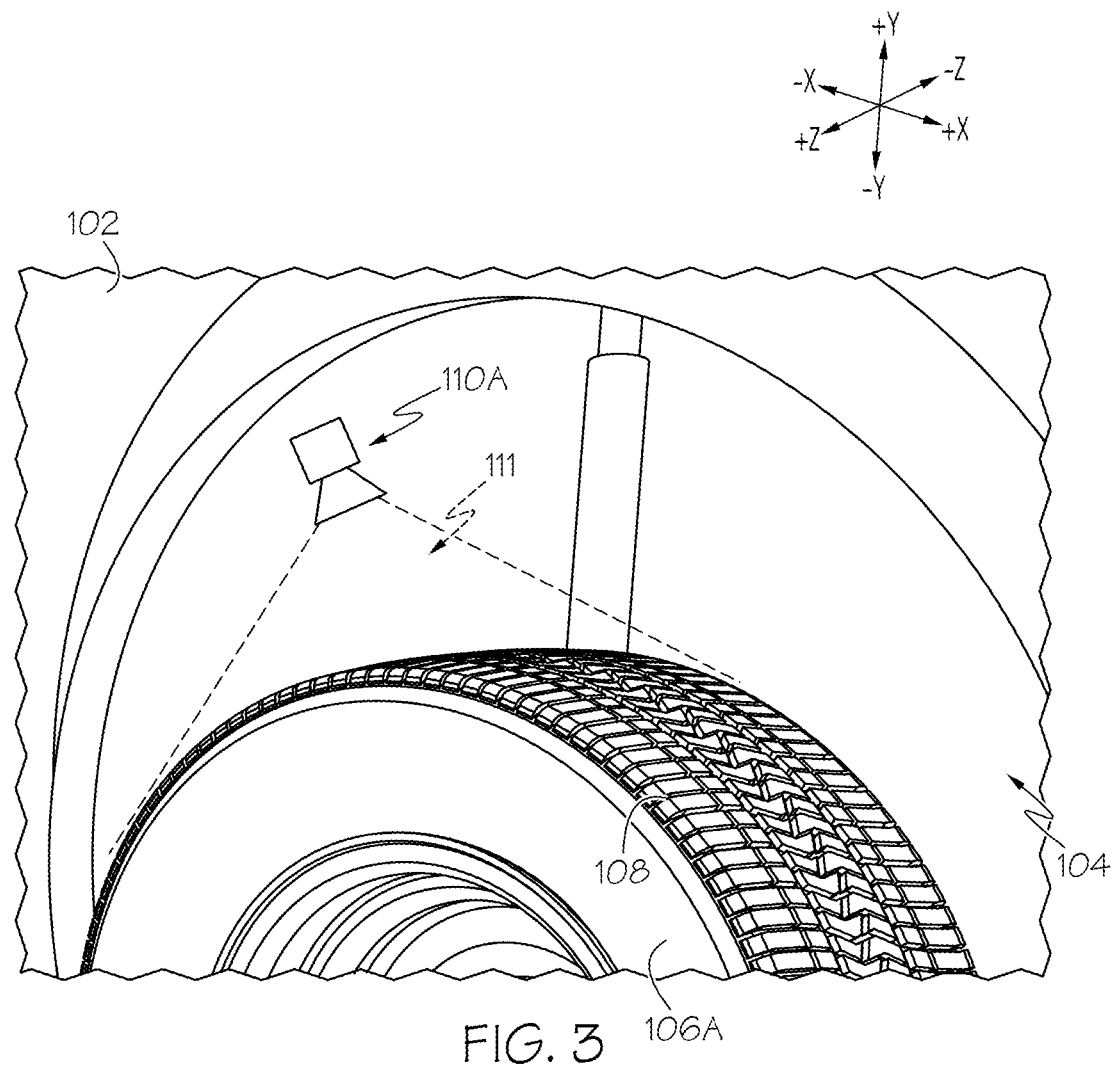
FIG. 3 schematically depicts a wheel well of the vehicle of FIG. 1 including the wheel sensor disposed at the wheel well, according to one or more embodiments described and illustrated herein.

Turning to FIG. 3, with reference to FIG. 1, schematically depicted is a wheel well 106 of the vehicle 102 including the wheel sensor 110A. According to at least one embodiment, the wheel sensors 110A, 110B, 110C, and/or 110D may be disposed at a wheel well 148 (FIG. 3), within one or more of the right front wheel 106A, left front wheel 106C, right rear wheel 106B, and left rear wheel 106D. In some embodiments, the wheel sensors 110A, 110B, 110C, and/or 110D may each include a combination of sensor devices, may be communicatively coupled to other sensor devices, or the like. In embodiments, where the wheel sensors 110A, 110B, 110C, and/or 110D are disposed at a wheel well 106, each sensor may include a field of view 111. The field of view 111 may generally encompass treads 108 of respective wheels, a roadway proximal to respective wheels (e.g., before, after, or adjacent to respective wheels). While right front wheel 106A is illustrated in FIG. 3, it is noted that the left front wheel 106C, right rear wheel 106B, and left rear wheel 106D may comprise similar aspects.

In embodiments, the wheel sensors 110A, 110B, 110C, and/or 110D may include a power source, a transmitter, a receiver, or other components configured to communicatively couple the wheel sensors 110A, 110B, 110C, and/or 110D to the electronic control unit 130. The wheel sensors 110A, 110B, 110C, and/or 110D may capture or detect parameters associated with a roadway and/or parameters respectively associated with the right front wheel 106A, left front wheel 106C, right rear wheel 106B, and left rear wheel 106D. The parameters associated with the roadway (e.g., road information) may include, for instance, a composition of the roadway (e.g., brick, stone, gravel, sand, concrete, blacktop, etc.) and environmental information. Environmental information may include, for example, irregularities of the roadway (e.g., potholes, cracks, etc.), foreign substances (e.g., loose debris, etc.), liquid substances (e.g., rain water, etc.), frozen liquids (e.g., ice, snow, etc.), or other information relating to driving conditions of the roadway. The parameters associated with the right front wheel 106A, left front wheel 106C, right rear wheel 106B, and left rear wheel 106D may include, for example, tread information (e.g., depth in the x, y, z coordinates of FIG. 3, wear, etc.), pressure, punctures (e.g., a foreign body embedded within a tire, a puncture hole, etc.), presence of foreign materials within the tread (e.g., snow, ice, mud, etc.), or other information pertaining to the wheels.

The wheel sensors 110A, 110B, 110C, and/or 110D and/or the electronic control unit 130 may determine characteristics of the roadway and the right front wheel 106A, left front wheel 106C, right rear wheel 106B, and left rear wheel 106D based on the detected parameters associated with the roadway and detected parameters associated with the wheels. For example, the electronic control unit 130 may determine if the roadway includes water, ice, snow, debris, obstacles, and composition of the roadway based on the detected information. In another example, the electronic control unit 130 may determine performance metrics for the right front wheel 106A, left front wheel 106C, right rear wheel 106B, and left rear wheel 106D based on the detected parameters. The performance metrics of each wheel may indicate a general fitness of a wheel, an ability to handle an amount of stress, a comparative fitness (e.g., rank of wheels), presence and location of a puncture within or through a tire, an improper tire, a pressure of a tire, or the like.

As described herein, the electronic control unit 130 may determine differences between treads 108 of a plurality of wheels based at least in part on the determined performance metrics. For instance, the electronic control unit 130 may determine that treads of a first wheel are filled or substantially filled with snow, treads of a second wheel are not filled or substantially filled with snow. As such, the electronic control unit 130 may assign a comparative performance metric that rates the second wheel as having a higher performance. In another example, the electronic control unit 130 may determine that treads of a first wheel are worn or substantially worn, while treads of a second wheel are not worn or substantially worn (e.g., or generally less worn than those of the first wheel). It is noted that the electronic control unit 130 may determine performance metrics for the wheels based on other factors or parameters.

The electronic control unit 130 may detect parameters associated with the right front wheel 106A, left front wheel 106C, right rear wheel 106B, and left rear wheel 106D while a user is driving. In some embodiments, the electronic control unit 130 may scan the right front wheel 106A, left front wheel 106C, right rear wheel 106B, and left rear wheel 106D while the vehicle is traveling at speeds below a threshold speed (e.g., under 5 miles per hour (mph), 10 mph, 25 mph, or the like). It is noted that the electronic control unit 130 may scan the right front wheel 106A, left front wheel 106C, right rear wheel 106B, and left rear wheel 106D at other times, such as during driving at speeds above the threshold speed, as a vehicle is accelerating, decelerating, or the like. In some embodiments, the electronic control unit 130 may notify a user to move the vehicle 102 to complete a scan, expose a puncture, or the like.

In embodiments, the electronic control unit 130 may determine one or more adjustments for operation of the vehicle 102 based at least in part on the parameters associated with the roadway, parameters associated with the wheels (e.g., performance metrics), and/or differences between the treads of the wheels. The adjustment may include selection of a driving mode, such as a manual mode, autonomous mode, semi-autonomous modes (e.g., adaptive cruise control lane assist modes), a sand driving mode, wet driving mode, snow/ice driving modes, a dry driving mode, performance driving modes, power saving driving modes, etc. For example, in response to identifying a sand or sand like composition from the parameters associated with the roadway, the electronic control unit 130 may determine that the vehicle 102 should be placed in a sand driving mode. As another example, the electronic control unit 130 may determine that the vehicle should be in one of a wet driving mode, snow/ice driving modes, or a dry driving mode based on or in response to respectively detecting a liquid substance, a frozen liquid, or a dry surface.

The electronic control unit 130 may determine to alter or adjust control of a drive train of vehicle 102 based on the one or more adjustments to alter torque applied to one or more of the right front wheel 106A, left front wheel 106C, right rear wheel 106B, and/or left rear wheel 106D. For instance, the electronic control unit 130 may determine that power to a wheel should be reduced or increased based on the performance parameters. In an embodiment, the electronic control unit 130 may determine to alter torque such that stress is relieved on a wheel having a low or lower associate performance metric. As an example, the electronic control unit 130 may determine to alter the torque applied to the wheels based on the performance metrics of the wheels and the detected parameters associated with the roadway. As further examples, the electronic control unit 130 may determine to adjust torque to increase traction, control, braking potential, or other driving parameter such that wheels having greater performance metrics may be more heavily relied on in when wheels are wet, the vehicle 102 is or is at a heightened risk of hydroplaning, the roadway has snow or ice disposed thereon, and the like. Moreover, the electronic control unit 130 may iterate adjustments to regulate traction control of the vehicle 102.

In some embodiments, the electronic control unit 130 may determine to alter or adjust a trajectory of the vehicle 102. The trajectory may include the speed, direction, turning radius, angle, etc. The electronic control unit 130 may adjust a trajectory, such as in an autonomous driving mode or semi-autonomous driving mode to avoid turns that rely on or put added stress on a wheel having a low or lower performance metric. For instance, the electronic control unit 130 may be configured to adjust the vehicle 102 trajectory for an obstacle avoidance path of vehicle to reduce stress potential on at least one of the wheels of the vehicle 102 having a lowest associated performance metric.

The electronic control unit 130 may be configured to determine an adjustment to be made that identifies whether or when a tire should be replaced, when or whether the tires should be rotated, whether a particular make or model of tire should be utilized, or the like. In an example, the vehicle 102 may comprise a racing automobile and the electronic control unit 130 may determine whether and when the racing automobile should enter a pit stop for replacement of tires, whether different makes and models of the vehicle should be utilized, or other adjustments to the wheels or vehicle 102.

The electronic control unit 130 may transmit a notification regarding the adjustment to a display, such as a dashboard of the vehicle. The notification may include a prompt to instruct a user to complete an action, such as switch driving modes, avoid sharp turns at high speeds, or the like. In some examples, the notification may inform a user that the electronic control unit 130 has determined and/or implemented an adjustment without requiring user action. It is noted that a user may override an adjustment.

According to embodiments, the electronic control unit 130 may implement the adjustment through one or more instructions to one or more components of the vehicle 102, such as the engine 114, a braking-system apparatus 146, a steering apparatus (not shown), an autonomous or semi-autonomous driving unit (e.g., such as logic stored in memory 134 and executed by a processor 132 (FIG. 2)), or other components, such as components of a drive train. In an example, the electronic control unit 130 implements the adjustment by instructing the engine 114 and/or other motors or engines (e.g., motors or engines of an all-wheel drive system, an autonomous driving system, etc.) to alter torque applied to one or more of the right front wheel 106A, left front wheel 106C, right rear wheel 106B, and/or left rear wheel 106D. In another example, electronic control unit 130 may alter trajectories or driving parameters to avoid turns having a predetermined angle(s) at predetermined speeds to avoid adding stress on a wheel having a performance metric below a predetermined performance, or otherwise to utilize wheels having generally more potential for traction based on tread condition, which may indicate a predicted handling performance, predicted stopping performance, or predicted stress performance.

Figure 2:
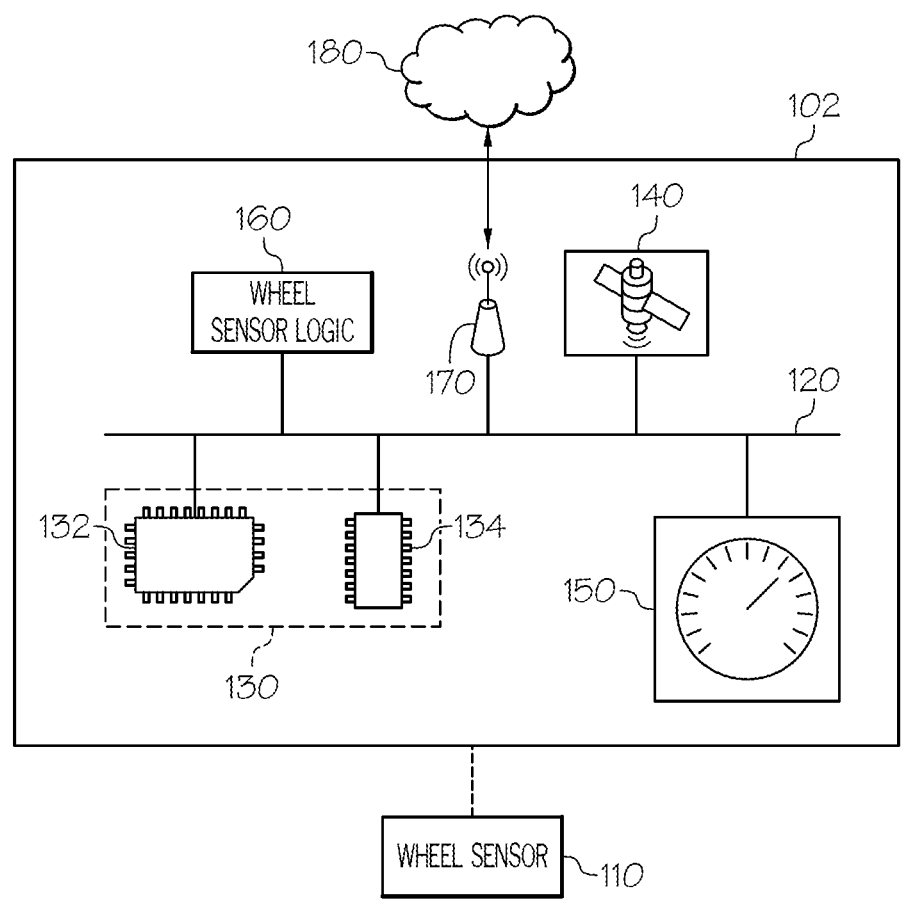
FIG. 2 schematically depicts components of the vehicle of FIG. 1, according to one or more embodiments shown and described herein.

Referring now to FIG. 2, an example schematic of a portion of the vehicle 102 including sensor resources and a computing device is depicted. In at least some embodiments, the vehicle 102 may include an electronic control unit 130 comprising a processor 132 and a non-transitory computer readable memory 134, a navigation unit 140 (e.g., global positioning system (GPS), compass, etc.), vehicle sensor(s) 150 (e.g., vehicle speed sensors, motion sensors, proximity sensors, etc.), a communications unit 170, and wheel sensor(s) 110 (e.g., wheel sensors 110A-110D). These and other components of the vehicle 102 may be communicatively connected to each other via a communication bus 120.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverse. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the vehicle 102 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. While the embodiment depicted in FIG. 2 includes a single processor 132, other embodiments may include more than one processor 132.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1 GL, 2 GL, 3 GL, 4 GL, or 5 GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory 134, other embodiments may include more than one memory module.

The non-transitory computer readable memory 134 may include or be in communication with wheel sensor logic 160. The wheel sensor logic 160 may include computer readable instructions that, when executed by the processor 132, cause the processor 132 to provide functions described herein. The wheel sensor logic 160 may receive information from and transmit information to one or more wheel sensors 110. The wheel sensor logic 160 may identify parameters associated with the roadway, parameters associated with the wheels of the vehicle, or other parameters. The wheel sensor logic 160 may determine adjustments to be made to the vehicle 102, such as adjustments to torque, driving modes, trajectories, or other adjustments as described herein.

The vehicle 102 may also include a vehicle sensor(s) 150 coupled to the communication bus 120 and communicatively coupled to the electronic control unit 130. The vehicle sensor(s) 150 may be any sensor or system of sensors for generating a signal indicative of vehicle speed, movement, proximity to other vehicles, etc. For example, without limitation, a vehicle sensor(s) 150 may be a tachometer that is capable of generating a signal indicative of a rotation speed of a shaft of the vehicle 102 engine or a drive shaft. Signals generated by the vehicle sensor(s) 150 may be communicated to the electronic control unit 130 and converted to a vehicle speed value. The vehicle speed value is indicative of the speed of the vehicle 102. In some embodiments, the vehicle sensor(s) 150 comprises an opto-isolator slotted disk sensor, a Hall Effect sensor, a Doppler radar, or the like. In some embodiments, a vehicle sensor(s) 150 may comprise data from a GPS for determining the speed of a vehicle 102. The vehicle sensor(s) 150 may be provided so that the electronic control unit 130 may determine when the vehicle 102 accelerates, maintains a constant speed, slows down or comes to a stop. For example, a vehicle sensor(s) 150 may provide signals to the electronic control unit 130 indicative of a vehicle 102 slowing down due to a change in traffic conditions or prior to the vehicle performing a turning maneuver.

According to embodiments, the wheel sensor logic 160 may utilize information from the vehicle sensor(s) 150, the navigation unit 140, or other components described in FIG. 2. In an embodiment, the wheel sensor logic 160 may determine adjustments for the vehicle 102 based on the parameters associated with the roadway and the parameters associated with the wheels of the vehicle 102 and speed information from the vehicle sensor(s) 150. For example, the wheel sensor logic 160 may determine to alter a trajectory or adjust torque based on the speed of the vehicle, the roadway conditions, and/or tread conditions. Moreover, the wheel sensor logic 160 may determine an adjustment or trajectory based on GPS information. For instance, the wheel sensor logic 160 may avoid a particular route, select a lane of a multi-lane roadway, or otherwise set a navigational path to avoid stress on a wheel having low tread conditions.

Figure 4:
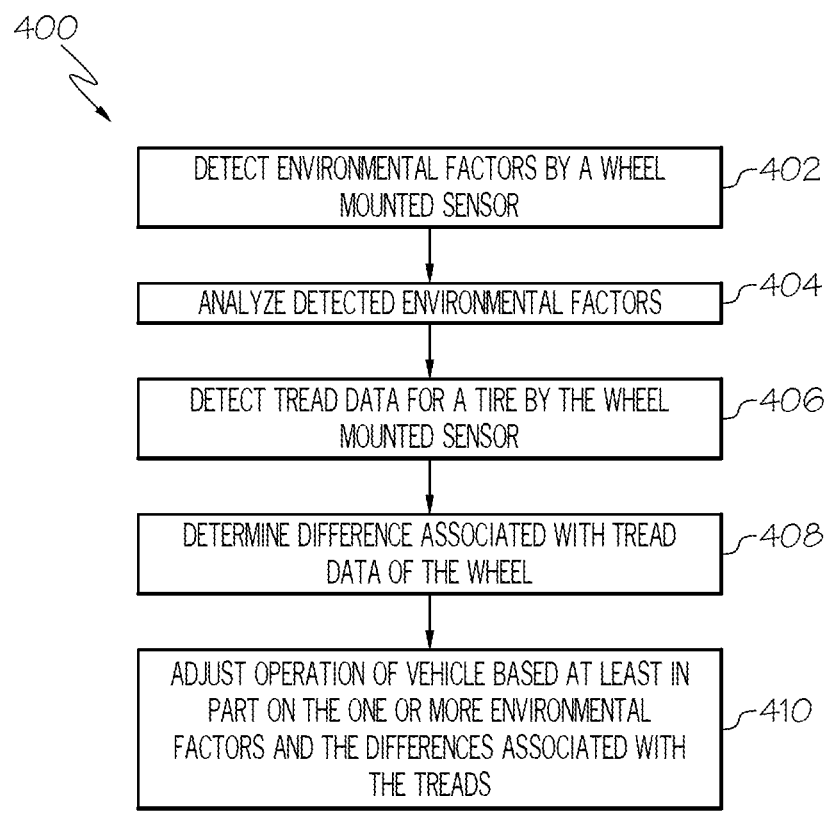
FIG. 4 depicts a flowchart of an example method for method for determining adjustments to a vehicle based on detected environmental factors and detected tread data according to one or more embodiments shown and described herein.

In view of the subject matter described herein, methods that may be related to various embodiments may be appreciated with reference to the flowchart of FIG. 4. While methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by a system 100 or components thereof, such as the electronic control unit 130 (e.g., FIGS. 2-3), or the like.

FIG. 4 depicts a flowchart 400 of an example method for determining adjustments to a vehicle based on detected environmental factors and detected tread data. The flowchart 400 depicted in FIG. 4 is a representation of a machine-readable instruction set stored in the non-transitory computer readable memory 134 and executed by the processor 132 of an electronic control unit 130. The process of the flowchart 400 in FIG. 4 may be executed at various times and intermittently repeated (e.g., every minute, five minutes, etc.) or upon triggering events (e.g., starting of a vehicle, movement of a vehicle, manual input, etc.).

At block 402, a plurality of sensors disposed at a plurality of wheel wells of a vehicle may detect environmental factors. For instance, a plurality of wheel sensors may detect one or more environmental factors associated with road conditions based on captured data, such as image data or the like. In examples, the environmental factors may include information such as irregularities of the roadway (e.g., potholes, cracks, etc.), foreign substances (e.g., loose debris, etc.), liquid substances (e.g., rainwater, etc.), frozen liquids (e.g., ice, snow, etc.), or other information relating to driving conditions of the roadway. The environmental factors may be identified according to image recognition algorithms, spectral analysis, moisture sensors, or the like.

At block 404, wheel sensors may detect tread data. The tread data may include tread information (e.g., depth in the x, y, z coordinates of FIG. 3, wear, etc.), pressure, punctures (e.g., a foreign body embedded within a tire of the wheel, a puncture hole, etc.), presence of foreign materials within the tread (e.g., snow, ice, mud, etc.), or other information pertaining to the wheels. The tread data may be analyzed by the electronic control unit 130 to identify parameters according to image recognition algorithms, spectral analysis, moisture sensors, or the like.

At block 406, the electronic control unit 130 may determine differences between the tread data of the wheels. In an example, the electronic control unit 130 may determine differences in treads of a plurality of wheels based on the tread data. The differences may include tread depth, ware, punctures, presence of foreign materials within the tread, or the like. In examples, the differences may be measured according to a performance metric.

At block 408, the electronic control unit 130 may adjust operation of vehicle based at least in part on the one or more environmental factors and the differences associated with the treads. As described herein, the adjustments may include selection of a driving mode, modification of torque control, adjustments to trajectories, adjustments to collision avoidance planning, or other adjustments as described herein. It is noted that adjustments may be performed automatically (e.g., without user input). In some embodiments, a user may be prompted to accept or reject an adjustment, complete an action, or otherwise provide feedback to the electronic control unit 130 regarding the adjustment.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   one or more wheel sensors operable to be disposed at least one of within one or more wheels of a vehicle or at one or more wheel wells of the vehicle, wherein each wheel sensor of the one or more wheel sensors is configured to detect both one or more parameters associated with treads of the one or more wheels and one or more parameters associated with road conditions;
   an electronic control unit, wherein the electronic control unit is configured to:
   receive, from the one or more wheel sensors, the one or more parameters associated with treads of the one or more wheels and the one or more parameters associated road conditions;
   determine a performance metric of the one or more wheels based on the one or more parameters associated with treads of the one or more wheels; and
   determine one or more adjustments for operation of the vehicle based at least in part on the performance metric of the one or more wheels and the one or more parameters associated with the road conditions; and
   adjust an obstacle avoidance path of the vehicle based on the one or more adjustments to reduce stress potential on at least one of the one or more wheels of the vehicle having a lowest associated performance metric.

2. The system of claim 1, wherein each wheel sensor consists of an RGB-D sensor.

3. The system of claim 1, wherein the electronic control unit is further configured to adjust a drive train of the vehicle based on the one or more adjustments to alter torque applied to the one or more wheels by at least one of a motor or an engine.

4. The system of claim 1, wherein the electronic control unit is further configured to determine one or more differences associated with treads of the one or more wheels, and determine the one or more adjustments based at least in part on the one or more differences, the performance metric of the one or more wheels, and the one or more parameters associated with the road conditions.

5. The system of claim 1, wherein the one or more wheel sensors is configured to detect the parameters associated with treads of the one or more wheels based on at least one of a detected presence of a foreign material within the treads of the one or more wheels.

6. The system of claim 5, wherein the foreign material comprises at least one of a liquid substance, a frozen substance, or a generally dry and solid substance.

7. The system of claim 1, wherein the one or more wheel sensors is configured to detect the parameters associated with treads of the one or more wheels based on at least one of a depth or wear of the treads of the one or more wheels.

8. The system of claim 1, wherein the one or more wheel sensors is configured to detect the parameters associated with the road conditions based on at least one of a detected presence of a liquid substance, a frozen substance, or a generally dry and solid substance disposed on a road way.

9. A system comprising:
   a plurality of wheel sensors each disposed at one of a plurality of wheel wells of a vehicle, and each wheel sensor of the plurality of wheel sensors is configured to include a line of sight that operatively includes one of a plurality of wheels of the vehicle, a driving surface proximal the plurality of wheels of the vehicle, or both; and
   detect both one or more parameters associated with treads of respective ones of the plurality of wheels, one or more parameters associated with road conditions, or both;
   one or more sensor cleaning apparatuses configured as a nozzle that disperses fluid to clean one or more of the plurality of wheel sensors of foreign substances; and
   an electronic control unit, wherein the electronic control unit is configured to:
   receive, from the plurality of wheel sensors, the one or more parameters associated with treads of the plurality of wheels and the one or more parameters associated road conditions;
   determine a performance metric for each of the plurality of wheels based on the one or more parameters associated with treads of the plurality of wheels; and
   determine one or more adjustments for operation of the vehicle based at least in part on the performance metric for each of the plurality of wheels and the one or more parameters associated with the road conditions.

10. The system of claim 9, further comprising at least one of a motor or an engine communicatively coupled to the electronic control unit and configured to apply a driving force to the plurality of wheels, wherein the electronic control unit transmits an instruction to the at least one of the motor or the engine based on the one or more adjustments.

11. The system of claim 10, wherein the at least one of the motor or the engine implements the instruction to apply torque to the plurality of wheels.

12. The system of claim 9, wherein the electronic control unit determines the one or more adjustments as a trajectory for collision avoidance.

13. The system of claim 9, wherein the electronic control unit is further configured to generate a notification based on the one or more adjustments.

14. The system of claim 13, wherein the notification includes at least one of a notification instructing a display unit to display a prompt to replace one or more the plurality of wheels, rotate the plurality of wheels, or modify a driving mode.

15. The system of claim 9, wherein the electronic control unit is configured to determine the performance metric as at least one of a predicted handling performance, predicted stopping performance, or predicted stress performance.

16. A method comprising:
detecting, by a plurality of sensors disposed at a plurality of wheel wells of a vehicle, one or more environmental factors associated with road conditions, and tread data associated with treads of a plurality of wheels of the vehicle, wherein each sensor of the plurality of sensors is configured to detect both the one or more environmental factors and the tread data; and
determining differences between the treads of the plurality of wheels based on the tread data; and
adjusting operation of vehicle based at least in part on the one or more environmental factors and the differences associated with the treads, wherein adjusting operation of the vehicle comprises adjusting an obstacle avoidance path of the vehicle to reduce stress potential on at least one of the one or more wheels.

17. The method of claim 16, further comprising identifying the one or more environmental factors associated with the road conditions based on image data from the plurality of sensors.

18. The method of claim 16, wherein the adjusting operation of the vehicle includes modifying torque applied to at least one of the plurality of wheels.

* * * * *